US009594499B2

(12) United States Patent
Britton

(10) Patent No.: US 9,594,499 B2
(45) Date of Patent: Mar. 14, 2017

(54) METHOD AND APPARATUS FOR HOVER-BASED SPATIAL SEARCHES ON MOBILE MAPS

(75) Inventor: Jason Adam Britton, Vista, CA (US)

(73) Assignee: Nokia Technologies Oy, Espoo (FI)

( * ) Notice: Subject to any disclaimer, the term of this patent is extended or adjusted under 35 U.S.C. 154(b) by 38 days.

(21) Appl. No.: 13/401,358

(22) Filed: Feb. 21, 2012

(65) Prior Publication Data

US 2013/0219308 A1    Aug. 22, 2013

(51) Int. Cl.
| | | |
|---|---|---|
| G06F 3/033 | (2013.01) | |
| G06F 3/0488 | (2013.01) | |
| G06F 17/30 | (2006.01) | |
| H04M 1/725 | (2006.01) | |

(52) U.S. Cl.
CPC ...... *G06F 3/0488* (2013.01); *G06F 17/30241* (2013.01); *G06F 2203/04108* (2013.01); *H04M 1/72544* (2013.01); *H04M 2250/22* (2013.01)

(58) Field of Classification Search
CPC ......... G06F 3/0488; G06F 2203/04108; G06F 17/30241; H04M 1/72544; H04M 2250/22
USPC ....................................................... 715/764
See application file for complete search history.

(56) References Cited

U.S. PATENT DOCUMENTS

| | | | | |
|---|---|---|---|---|
| 8,412,591 | B2* | 4/2013 | Ajala | G06Q 30/02 705/26.61 |
| 2004/0220906 | A1* | 11/2004 | Gargi et al. | 707/3 |
| 2006/0109252 | A1* | 5/2006 | Kolmykov-Zotov | G06F 3/03545 345/173 |
| 2006/0161871 | A1* | 7/2006 | Hotelling et al. | 715/863 |
| 2008/0012835 | A1* | 1/2008 | Rimon et al. | 345/173 |
| 2008/0165140 | A1* | 7/2008 | Christie et al. | 345/173 |
| 2008/0183597 | A1* | 7/2008 | Veerappan et al. | 705/27 |
| 2008/0259053 | A1 | 10/2008 | Newton | |
| 2008/0301565 | A1* | 12/2008 | Abhyanker | 715/744 |
| 2008/0305808 | A1* | 12/2008 | Chan et al. | 455/456.1 |
| 2008/0319806 | A1* | 12/2008 | Abhyanker | 705/5 |
| 2009/0024965 | A1* | 1/2009 | Zhdankin et al. | 715/863 |
| 2009/0051661 | A1* | 2/2009 | Kraft | G06F 3/04886 345/173 |
| 2009/0055091 | A1* | 2/2009 | Hines et al. | 701/207 |
| 2009/0064144 | A1* | 3/2009 | Abhyanker | 718/100 |
| 2009/0132316 | A1* | 5/2009 | Florance et al. | 705/7 |
| 2009/0284495 | A1* | 11/2009 | Geaghan | G06F 3/0416 345/174 |

(Continued)

OTHER PUBLICATIONS

Martin et al., "A Contextual Geofencing Mobile Tourism Service," 2011, Information and Communication Technologies in Tourism 2011, pp. 191-202.*

(Continued)

*Primary Examiner* — Ajay Bhatia
*Assistant Examiner* — Nicholas Klicos
(74) *Attorney, Agent, or Firm* — Ditthavong & Steiner, P.C.

(57) ABSTRACT

An approach is provided for enabling hover-based interactions to define spatial searches on mobile maps. A user interaction manager causes, at least in part, a rendering of at least one user interface depicting mapping information. A user interaction manager then processes and/or facilitates a processing of one or more hover-based interactions with the at least one user interface to determine one or more parameters for one or more spatial searches over the mapping information.

21 Claims, 10 Drawing Sheets

(56) References Cited

U.S. PATENT DOCUMENTS

| | | | |
|---|---|---|---|
| 2009/0315848 A1* | 12/2009 | Ku | G06F 3/0416 345/173 |
| 2010/0005427 A1* | 1/2010 | Zhang et al. | 715/863 |
| 2010/0066696 A1* | 3/2010 | Yang | G06F 1/3231 345/173 |
| 2010/0094548 A1* | 4/2010 | Tadman et al. | 701/209 |
| 2010/0293193 A1 | 11/2010 | Harrison et al. | |
| 2011/0007021 A1* | 1/2011 | Bernstein et al. | 345/174 |
| 2011/0063319 A1* | 3/2011 | Cho | G06F 17/30241 345/582 |
| 2011/0109577 A1 | 5/2011 | Lee et al. | |
| 2011/0178811 A1* | 7/2011 | Sheridan | 705/1.1 |
| 2011/0193795 A1* | 8/2011 | Seidman et al. | 345/173 |
| 2011/0205163 A1* | 8/2011 | Hinckley et al. | 345/173 |
| 2011/0221776 A1* | 9/2011 | Shimotani et al. | 345/647 |
| 2011/0234491 A1* | 9/2011 | Nurmi | G06F 3/041 345/157 |
| 2012/0006997 A1* | 1/2012 | Frosien | 250/396 ML |
| 2012/0007854 A1 | 1/2012 | Cho | |
| 2012/0042288 A1* | 2/2012 | Liao et al. | 715/863 |
| 2012/0068941 A1* | 3/2012 | Arrasvuori | G06F 3/04883 345/173 |
| 2012/0072840 A1* | 3/2012 | Koshi | G06F 3/0482 715/702 |
| 2012/0102436 A1* | 4/2012 | Nurmi | 715/863 |
| 2012/0188285 A1* | 7/2012 | Friedlander et al. | 345/660 |
| 2013/0050131 A1 | 2/2013 | Lee et al. | |
| 2013/0106859 A1* | 5/2013 | Koshi | G06F 3/0484 345/440 |
| 2015/0073941 A1* | 3/2015 | Burrows et al. | 705/26.62 |

OTHER PUBLICATIONS

Sokoloski, "Google Labs—New Map Tool: Drag 'n Zoom," Feb. 21, 2010, accessed on Jun. 24, 2013, accessed from Internet <http://blog.discoveryeducation.com/blog/2010/02/21/google-labs-new-map-tool-drag-n-zoom/>, pp. 1-2.*

Xiao et al., "Image-based Street-side City Modeling," Dec. 2009, ACM Transactions on Graphics, vol. 28, No. 5, Article 114, pp. 1-12.*

Exclusive Polygon Search inPheonix.com—YouTube, http://www.youtube.com/watch?v=eJ3Oilhf4xg&feature=related, Accessed: Jun. 21, 2012.

Google Maps Navigation (Beta): search by voice—YouTube, http://www.youtube.com/watch?v=jLXZ5BHeDFg, Accessed: Jun. 21, 2012.

MyRealPage Google Map Listing Search, http://www.youtube.com/watch?v=fJjUIOag3t0, Accessed: Jun. 21, 2012.

myRealPage.com : Websites for Real Estate : Welcome to myRealPage.com, http://www.myrealpage.com, Accessed: Jun. 21, 2012.

TrueTouch TouchScreen Controllers: Real Hover Technology with TrueTouch—Cypress Semiconductor, http://www.cypress.com/touch, Accessed: Jun. 21, 2012.

Notification of Transmittal of the International Search Report and The Written Opinion of the International Searching Authority, or the Declaration for International Application No. PCT/FI2013/050163, dated May 14, 2013, pp. 1-16.

C. Juchmes "Hover sensing in touch UI", posted Jan. 11, 2012, retrieved from internet http://www.eetindia.co.in/STATIC/PDF/201201/EEIOL_2012JAN11_SENS_TA_01.pdf?SOURCES=Download, EE Times—India, pp. 1-4.

Landvision "DataSheet", Jan. 28, 2012, retrieved from internet http://web.archive.org/web/20120128224653/http://www.digmap.com/products/LandVisionEditionsChart.html, pp. 1-2.

European Office Action for related European Patent Application No. 13751403.0-1507 dated Sep. 18, 2015, 6 Pages.

Juchmes, "Hover sensing in touch UI", EE Times—India, Jan. 11, 2012, XP055160066, retrieved on Sep. 24, 2015 from http://m.eetindia.co.in/STATIC/PDF/201201/EEIOL_2012JAN11_SENS_TA_01.pdf?SOURCES=DOWNLOAD, 4 Pages.

* cited by examiner

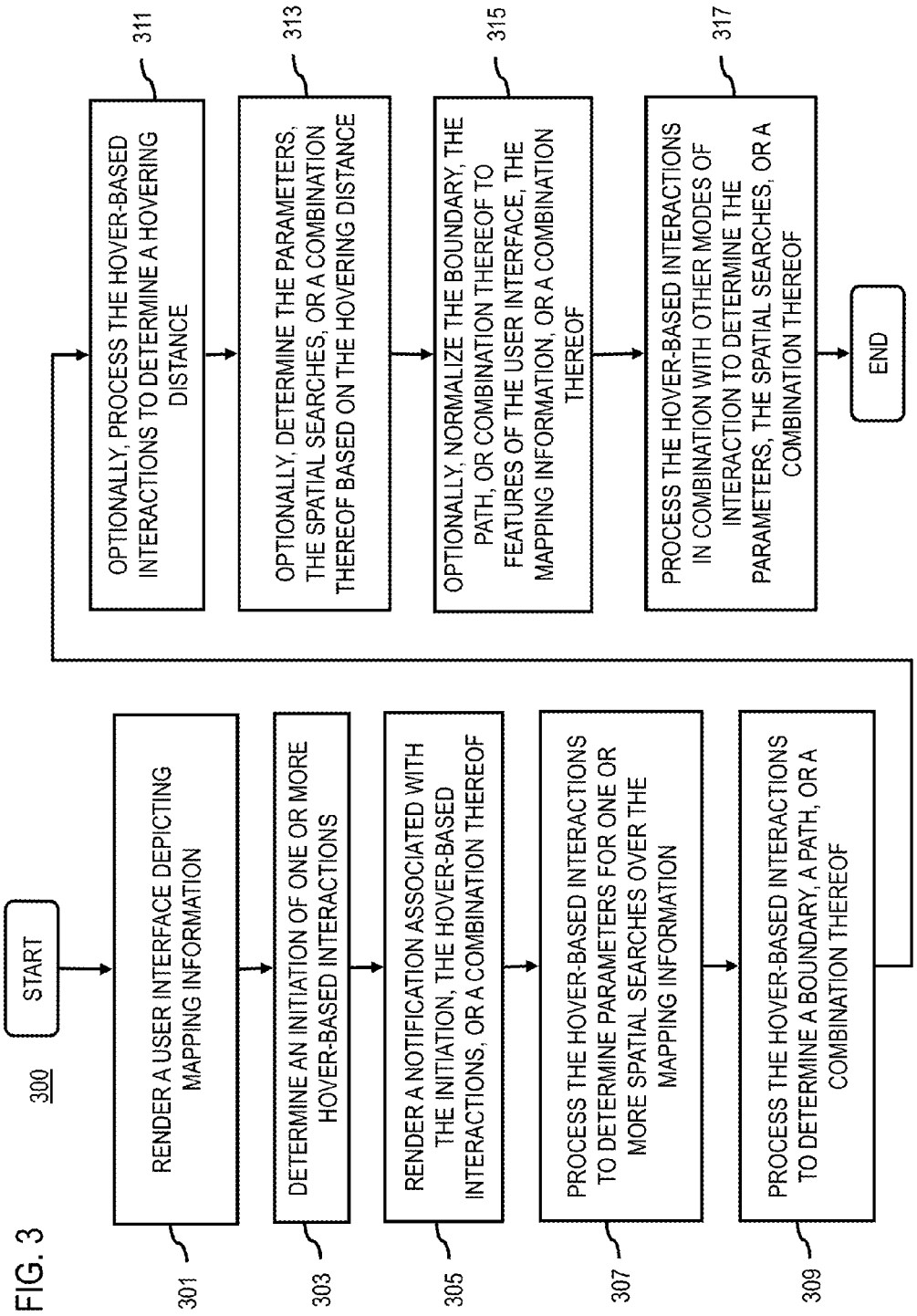

METHOD AND APPARATUS FOR HOVER-BASED SPATIAL SEARCHES ON MOBILE MAPS

BACKGROUND

Service providers and device manufacturers (e.g., wireless, cellular, etc.) are continually challenged to deliver value and convenience to consumers by, for example, providing compelling network services. One area of interest has been the development of mapping and location-based services that allow users to conduct searches and/or queries utilizing mobile devices (e.g., mobile phones and/or mobile tablets). By way of example, most mobile map applications currently enable users to construct search parameters based on a geographic range (e.g., within 10 miles, 25 miles, etc.) and/or an object criteria (e.g., restaurants, museums, etc.). If these parameters are general in nature, they will typically return to the user multiple results, which are displayed on the map radiating from a specific location (e.g., either a current global positioning system (GPS) location or an address entered by the user). Companies are beginning to implement spatial search capabilities on some websites (e.g., myRealPage.com) that can be used by electronic devices that use a pointer device (e.g., mouse-enabled desktop computers and/ or laptop computers). However, current mobile map applications do not support methods for conducting spatially-defined searches (i.e., allowing users to search within a specifically defined geographical area depicted on a digital map). Moreover, while most current smartphones enable users to use their fingers as a cursor control device, this particular touch function is typically assigned to more critical core tasks such as panning and/or zooming on a digital map. Accordingly, service providers and device manufacturers face significant technical challenges in providing a service that enables users to define spatial searches on mobile maps without requiring additional hardware configuration to the mobile devices and/or pointer-type peripherals.

SOME EXAMPLE EMBODIMENTS

Therefore, there is a need for an approach for enabling hover-based interactions to define spatial searches on mobile maps.

According to one embodiment, a method comprises causing, at least in part, a rendering of at least one user interface depicting mapping information. The method also comprises processing and/or facilitating a processing of one or more hover-based interactions with the at least one user interface to determine one or more parameters for one or more spatial searches over the mapping information.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a rendering of at least one user interface depicting mapping information. The apparatus is also caused to process and/or facilitate a processing of one or more hover-based interactions with the at least one user interface to determine one or more parameters for one or more spatial searches over the mapping information.

According to another embodiment, a computer-readable storage medium carries one or more sequences of one or more instructions which, when executed by one or more processors, cause, at least in part, an apparatus to cause, at least in part, a rendering of at least one user interface depicting mapping information. The apparatus is also caused to process and/or facilitate a processing of one or more hover-based interactions with the at least one user interface to determine one or more parameters for one or more spatial searches over the mapping information.

According to another embodiment, an apparatus comprises means for causing, at least in part, a rendering of at least one user interface depicting mapping information. The apparatus also comprises means for processing and/or facilitating a processing of one or more hover-based interactions with the at least one user interface to determine one or more parameters for one or more spatial searches over the mapping information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for enabling hover-based interactions to define spatial searches on mobile maps, according to one embodiment;

DESCRIPTION OF SOME EMBODIMENTS

Examples of a method, apparatus, and computer program for enabling hover-based interactions to define spatial searches on mobile maps are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "hover-based interaction" refers to a user bringing or positioning his or her finger to a determined height (e.g., 5 to 10 mm) above the screen of a mobile device (e.g., a mobile phone and/or mobile tablet) in order to provide input and feedback to the mobile device equipped with hover technology without requiring additional hardware configuration and/or pointer-type peripheral devices. More specifically, the hover technology enables the user's finger to serve as the pointer while still preserving the core functionality associated with most mobile devices (e.g., panning by touching a screen, zooming in and out by using a pinch gesture, etc.).

Figure 1:
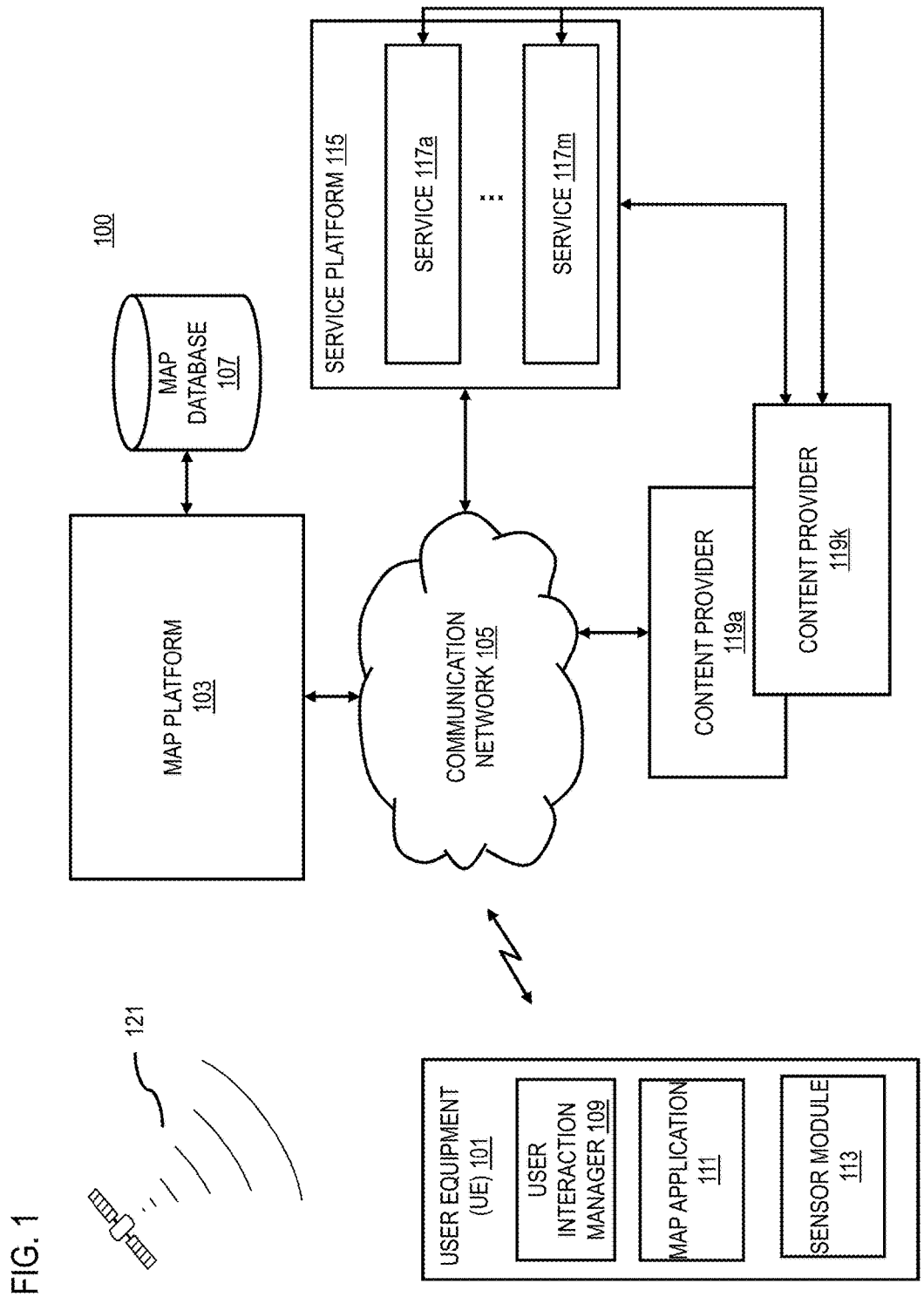
FIG. 1 is a diagram of a system capable of enabling hover-based interactions to define spatial searches on mobile maps, according to one embodiment.

FIG. 1 is a diagram of a system capable of enabling hover-based interactions that allow users to define spatial searches on mobile maps, according to one embodiment. One of the most important attributes of digital maps is that they represent physical space. When mobile device users use mobile map applications they often wish to find locations (e.g., restaurants, museums, etc.) on the map and/or directions to the location using the map. Current methods for defining search parameters are largely limited to searches based on geographic range (e.g., within 10 miles from the current location) and/or an objective criteria (e.g., restaurants, museums, etc.). By way of example, if a user wishes to find a restaurant in a city, he or she must first enter the name of the restaurant, the exact address, or perform a query search (e.g., "seafood restaurants"). In the case of the latter, the user must also provide an approximate search zone by entering a zip code, a city name, or a pre-defined range (e.g., 10 miles from current location as identified through GPS or similar location identification system). In addition, searches often may only be conducted in one zone at a time. For example, if a user wishes to simultaneously search two or more separate geographic areas, he or she must either conduct multiple searches or must enlarge the search zone to encompass all areas. However, this later type of searching can result in the return of large numbers of superfluous search results in areas outside of the one or more requested geographic areas. In addition, these methods of search are time consuming to enter and are often not specific enough since users cannot easily define the exact spatial zones within which to search. Furthermore, current mapping tools are limited in their ability to allow users to draw out the physical search area on a map (i.e., define a spatial search) and then run a query search only within the user-defined zone. While some companies have developed web-based tools that use cursors and menus to draw out an area on a real estate map (e.g., myrealpage.com) this type of search is not yet supported on mobile devices. In particular, mobile devices (e.g., mobile phones and/or mobile tablets) often lack peripherals that would permit users to define spatial searches on mobile map applications. Moreover, while smartphone operating systems do allow a user's touch to function as a cursor, touch functions are typically assigned to more critical core tasks such as panning a map within a screen or display. By way of example, sliding a finger on a mobile map application usually is assigned to panning the map, so that a user can move the view of the map in the display. As a result, the ability to use a drawing action by moving one's finger on a mobile map application is currently limited.

To address this problem, a system 100 of FIG. 1 introduces the capability to enable hover-based interactions to define spatial searches on mobile maps. In one embodiment, the system 100 renders at least one user interface (UI) depicting mapping information (e.g., a mobile map application, a digital map, etc.) on a mobile device (e.g., a mobile phone and/or a mobile tablet). The system 100 then determines an initiation of one or more hover-based interactions (e.g., hovering a finger a few millimeters above the screen of the mobile device) and renders at least one notification associated with the initiation, the one or more hover-interactions, or a combination thereof (e.g., a rendering a circle the approximate diameter of a fingertip, a clock, a search icon, etc.). By way of example, after a defined period of time (e.g., one to two seconds), the system 100 can render a cursor on the screen, centered under the location of the one or more hover-based interactions.

In one embodiment, the system 100 next processes the one or more hover-based interactions with the at least one user interface to determine one or more parameters for the one or more spatial searches over the mapping information. By way of example, the system 100 enables a user to draw an area on the mapping information where the user wishes to focus his or her search. More specifically, the system 100 processes the one or more hover-based interactions to determine at least one boundary, at least one path, or a combination thereof of the one or more spatial search zones and renders a visual indicator of where the spatial search area is located (e.g., indicated by a dashed outline). As the system 100 processes the one or more hover-based interactions, the system 100 also maintains the critical core tasks often associated with the mapping information (e.g., panning the map with a touch of the screen).

In one embodiment, the shape of the one or more user-defined spatial search zones may be as symmetric or asymmetric as a user needs in order to search in certain physical areas depicted on a digital map. By way of example, the spatial search zone may be based on an approximate distance (e.g., a walking distance, a driving distance, etc.). In one embodiment, the system 100 can cause a normalization of the least one boundary, the at least one path, or a combination thereof to one or more features of the at least one user interface, the mapping information, or a combination thereof. For example, the system 100 can determine to close off two or three lines drawn with one or more hover-interactions (e.g., complete a square) or the system 100 can determine to "snap" the at least one boundary, the at least one path, or a combination thereof to one or more geographic boundaries depicted on the mapping information (e.g., city blocks, roads, neighborhoods, etc.). In addition, in one embodiment, the system 100 processes the one or more hover-based interactions to determine at least one hovering distance (e.g., a few millimeters above the screen) and then determines the one or more parameters, the one or more spatial searches, or a combination thereof based on the at least one hovering distance. By way of example, a user can place his or her finger above the screen of a mobile device, hold it steady for a few seconds, and then hover it over another area to outline multiple spatial search zones. In addition, in one embodiment, the system 100 can process the one or more time periods associated with the one or more hover-based interactions in order to enable a user to switch between different options and/or commands associated with the mapping information, the user interface, or a combination thereof.

In one embodiment, once the system 100 determines one or more spatial search zones (e.g., drawn by a user using one or more hover-based interactions), the system 100 processes the one or more hover-based interactions in combination with one or more other modes of interaction (e.g., voice recognition, text search box, etc.) to determine the one or more parameters, the one or more spatial searches, or a combination thereof to conduct one or more searches within the one or more spatial search zones. By way of example, once the user draws an area where they wish to search with one or more hover-based interactions, the user can then verbally say what his or her specific query relates to (e.g., restaurants) and the system 100 will render the responsive search results that are located within the user-defined spatial search zone. More specifically, results located outside of the user-defined spatial search zone are excluded by the system 100, thus providing a filtered and more relevant search result to the user.

As shown in FIG. 1, the system 100 comprises a user equipment (UE) 101 having connectivity to a map platform 103 via a communication network 105. The mapping information, such as location information, may be included in a map database 107 associated with the map platform 103 for access by a user interaction manager 109 and/or a mobile map application 111. The user interaction manager 109 may exist independently within the UE 101 or within the mobile map application 111. Likewise, the map database 107 may exist in whole or in part within the map platform 103, or independently (e.g., within a cloud computing and/or cloud storage platform). The user interaction manager 109, in connection with the mobile map application 111, supports various search inputs and generates responsive search results that are then overlaid on top of the mapping information. More specifically, the user interaction manager 109 enables a user to provide hover-based inputs (e.g., hover-based interactions and touching) in connection with the mobile map application 111. The user interaction manager 109 also enables users to provide multi-zone inputs (e.g., draw multiple spatial search zones) on top of the mapping information. The UE 101 also contains a sensor module 113 that is used to distinguish between the hover-based inputs and to determine audio-based search queries (e.g., a proximity sensor and a sensor with voice recognition capabilities). More specifically, the sensor module 113 enables the user interaction manager 109 to track the "x" and "y" location and/or direction of a finger as well as the "z" distance of the finger above the display (e.g., a few millimeters).

In certain embodiments, the mapping information may be provided to the map platform 103 and/or the map database 107 by a service platform 115, which includes one or more services 117a-117m (also collectively referred to as services 117) (e.g., mapping services, user review and recommendations services, etc.), one or more content providers 119a-119k (also collectively referred to as content providers 117) (e.g., point of interest (POI) data providers, public databases, etc.), and/or other content sources available or accessible over the communication network 105.

In certain embodiments, the UE 101 may utilize location-based technologies (GPS receivers, cellular triangulation, assisted GPS (A-GPS), etc.) to provide mapping information. For example, the UE 101 may include a GPS receiver to obtain geographic coordinates from satellites 121 to determine the current location associated with the UE 101. In addition, the GPS receiver may help to quickly orient the mapping information at the start of a particular search query.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the user interaction manager 109 causes a rendering of at least one user interface (e.g., a graphical user interface (GUI)) that depicts mapping information (e.g., a mobile map application, a digital map, etc.) on the UE 101 (e.g., a mobile phone and/or a mobile tablet). The user interaction manager 109, in connection with the sensor module 113, then determines an initiation of one or more hover-based interactions (e.g., hovering a finger a few millimeters above the screen of the UE 101) and renders at least one notification accordingly (e.g., a circle the approximate diameter of a fingertip, fingertip, a clock, a search icon, etc.). By way of example, after a defined period of time (e.g., one to two seconds), the user interaction manager 109 can cause a rendering of a cursor on the screen of the mobile device, centered under the location of the one or more hover-based interactions.

In one embodiment, the user interaction manager 109 next processes the one or more hover-based interactions to determine one or more parameters for the one or more spatial searches over the mapping information. By way of example, the user interaction manager 109 enables a user to draw an area on the mapping information where the user wishes to focus his or her search. More specifically, the user interaction manager 109 processes the one or more hover-based interactions to determine at least one boundary, at least one path, or a combination thereof of the one or more spatial search zones and then renders a visual indicator of where the spatial search zone is located (e.g., indicated by a dashed outline). As the user interaction manager 109 processes the one or more hover-based interactions, the user interaction manager 109 also maintains the critical core tasks often associated with mapping information (e.g., panning the map with a touch of the screen, zooming in and out of the map with a pinching gesture, etc.).

In one embodiment, the shape of the one or more user-defined spatial search zones may be as symmetric or asymmetric as a user needs in order to search in certain physical areas depicted on a digital map. By way of example, the spatial search zone may be based on an approximate distance (e.g., a walking distance, a driving distance, etc.). In one embodiment, the user interaction manager 109 can determine to close off two or three lines drawn with one or more hover-based interactions (e.g., complete a square or a rectangle) or the user interaction manager 109 can determine to "snap" the at least one boundary, the at least on path, or a combination thereof to one or more geographic boundaries depicted on the mapping information (e.g., city blocks, roads, neighborhoods, etc.). In addition, in one embodiment, the user interaction manager 109, in connection with the sensor module 113, processes the one or more hover-based interactions to determine at least one hovering distance (e.g., a few millimeters above a screen) and determines one or more parameters, the one or more spatial searches, or a combination thereof based on the at least one hovering distance. By way of example, a user can place his or her finger above the screen of the UE 101, hold it steady for one to two seconds, and then hover it over another area to outline multiple spatial search zones. In addition, in one embodiment, the user interaction manager 109 can process the one or more time periods associated with the one or more hover-based interactions in order to switch between different options and/or commands associated with the mapping information, the user interface, or a combination thereof.

In one embodiment, once the user interaction manager 109 determines one or more spatial search zones (e.g., drawn by a user using one or more hover-based interactions), the user interaction manager 109 processes the one or more hover-based interactions in combination with one or more other modes of interaction (e.g., voice recognition, text search box, etc.) to determine the one or more parameters, the one or more spatial searches, or a combination thereof to conduct within the one or more spatial search zones. By way of example, once the user draws an area where they wish to search with one or more hover-based interactions, the user can then verbally say what his or her specific search query relates to (e.g., restaurants) and the user interaction manager 109 will cause a rendering of the responsive search results that are located within the user-defined spatial search zone. More specifically, results located outside of the spatial search zone are excluded by the user interaction manager 109, thus providing a filtered and more relevant search result to the user.

By way of example, the UE 101, the map platform 103, the map database 107, the user interaction manager 109, the map application 111, the service platform 115, and the content providers 119 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
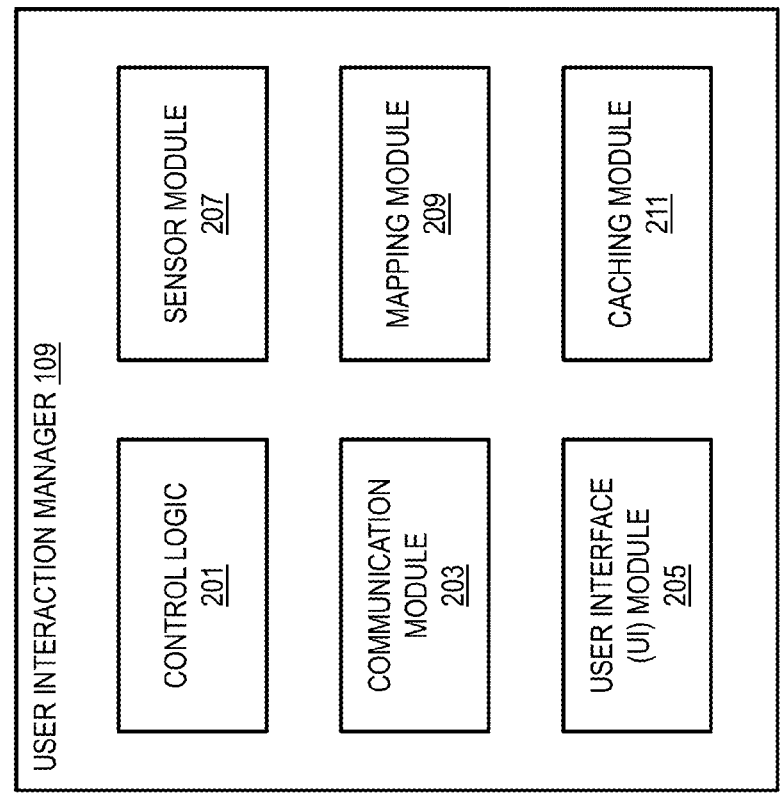
FIG. 2 is a diagram of the components of a user interaction manager, according to one embodiment.

FIG. 2 is a diagram of the components of a user interaction manager 109, according to one embodiment. By way of example, the user interaction manager 109 includes one or more components for enabling hover-based interactions to define spatial searches on mobile maps. It is contemplated that the functions of these components may be combined in one or more components or performed by other components of equivalent functionality. In this embodiment, the user interaction manager 109 includes a control logic 201, a communication module 203, a user interface (UI) module 205, a sensor module 207, a mapping module 209, and a caching module 211.

The control logic 201 oversees tasks, including tasks performed by the communication 203, the user interface module 205, the sensor module 207, the mapping module 209, and the caching module 211. For example, although other modules may perform the actual task, the control logic 201 may determine when and how those tasks are performed or otherwise direct the other modules to perform the task.

The communication module 203 is used for communication between the UE 101, the map platform 103, the user interaction manager 109, the map application 111, the service platform 115, the content providers 117, and the satellites 121. The communication module 203 may also be used to communicate commands, requests, data, etc. The communication module 203 also may be used in connection with the user interface module 205 to render at least one user interface depicting mapping information (e.g., a mobile map application, a digital map, etc.). The communication module 203 may also be used in connection with the sensor module 207 to render at least one notification associated with the initiation, the one or more hover-based interactions, or a combination thereof (e.g., a circle the approximate diameter of a fingertip, a clock, a search icon, etc.). In one embodiment, the communication module 203 may be used in connection with the user interface module 205, the sensor module 207, and the mapping module 209 in order to render the one or more spatial search zones (e.g., represented as a dashed outline) and responsive results (e.g., represented as numbers) on top of the mapping information. In addition, the communication module 203 may also be used in connection with the user interface module 205 and the sensor module 207 in order to render representative icons and determine information relative to the one or more other modes of interaction (e.g., voice recognition, text search boxes, etc.).

The user interface (UI) module 205 is used in connection with the communication module 203 to render at least one user interface depicting mapping information (e.g., a mobile map application, a digital map, etc.). The user interface module 205, in connection with the sensor module 207, may also be used to determine an initiation of one or more hover-based interactions (e.g., hovering a finger a few millimeters above the screen of a mobile device). The user interface module 205, in connection with the communication module 203, also may be used to render at least one notification associated with the initiation, the one or more hover-based interactions, or a combination thereof (e.g., rendering a circle the approximate diameter of a fingertip, a clock, a search icon, etc.). More specifically, the user interface module 205, in connection with the communication module 203, supports the graphical representation that user-defined spatial search zones are being drawn on top of the mapping information. The user interface module 205 may also be used to integrate existing search query methods (e.g., voice recognition technologies, text entry, etc.) into the at least one user interface of the UE 101. In addition, the user interface module 205 also may be used in connection with the communication module 203 and the mapping module 209 to render responsive search results on top of the mapping information.

The sensor module 207 is used to detect the "x", "y", and "z" placement and/or direction of a user's finger on and/or proximate to the screen or display of a mobile device (e.g., a mobile phone and/or a mobile tablet). More specifically, the sensor module 207, in connection with the user interface module 205 and the mapping module 209, enables hover-based interactions by simultaneously processing both the one or more hover-based interactions and the critical core tasks often associated with the mapping information (e.g., panning the map with a touch of the screen). In one embodiment, the sensor module 207 can also process the one or more time periods associated with the one or more hover-based interactions in order to enable a user to switch between different options and/or commands associated with the mapping information, the user interface, or a combination thereof. The sensor module 207, in connection with the user interface module 205, may also be used to provide multi-zone inputs related to the mapping information (e.g., enabling users to draw multiple spatial search zones). Furthermore, the sensor module 207, in connection with the user interface module 205, also may be used to accept audio search queries associated with the one or more spatial search zones. By way of example, voice recognition technologies can allow a user to enter search inputs into the mobile device without having to first open a keyboard.

The mapping module 209, in connection with the user interface module 205 and the sensor module 207, is used to interact with various mobile map applications, digital maps, etc. in order to support the spatial method of searching. More specifically, the mapping module 209, in connection with the user interface module 205 and the sensor module 207, processes the one or more hover-based interactions to determine at least one boundary, at least one path, or a combination thereof. By way of example, a user can draw with the one or more hover-based interactions a specific zone on the mapping information that he or she wishes to search. In one embodiment, the mapping module 209 may also be used to enable a user to define one or more spatial search zones based on one or more symmetrical shapes, one or more asymmetrical shapes, or a combination thereof. The mapping module 209 also may be used to cause a normalization of the least one boundary, the at least one path, or a combination thereof to one or more features of the mapping information. For example, the mapping module 209 may be used to close off two or three lines drawn with the one or more hover-based interactions (e.g., complete a square or a rectangle) or the mapping module 209 may be used to "snap" the at least one boundary, at least one path, or a combination thereof to one or more geographic boundaries depicted on the mapping information (e.g., city blocks, roads, neighborhoods, etc.).

The caching module 211, in connection with the user interface module 205, is used to cause a caching of the one or more user-defined spatial search zones, one or more responsive results, one or more user preferences (e.g., automatically closing shapes, snapping lines, etc.), or a combination thereof at a mobile device (e.g., the UE 101). The caching module 211, in connection with the communication module 203, may also be used to store the one or more user-defined spatial search zones, the one or more responsive results, the one or more user preferences, or a combination thereof at the map platform 103 and/or the map database 107.

Figure 6:
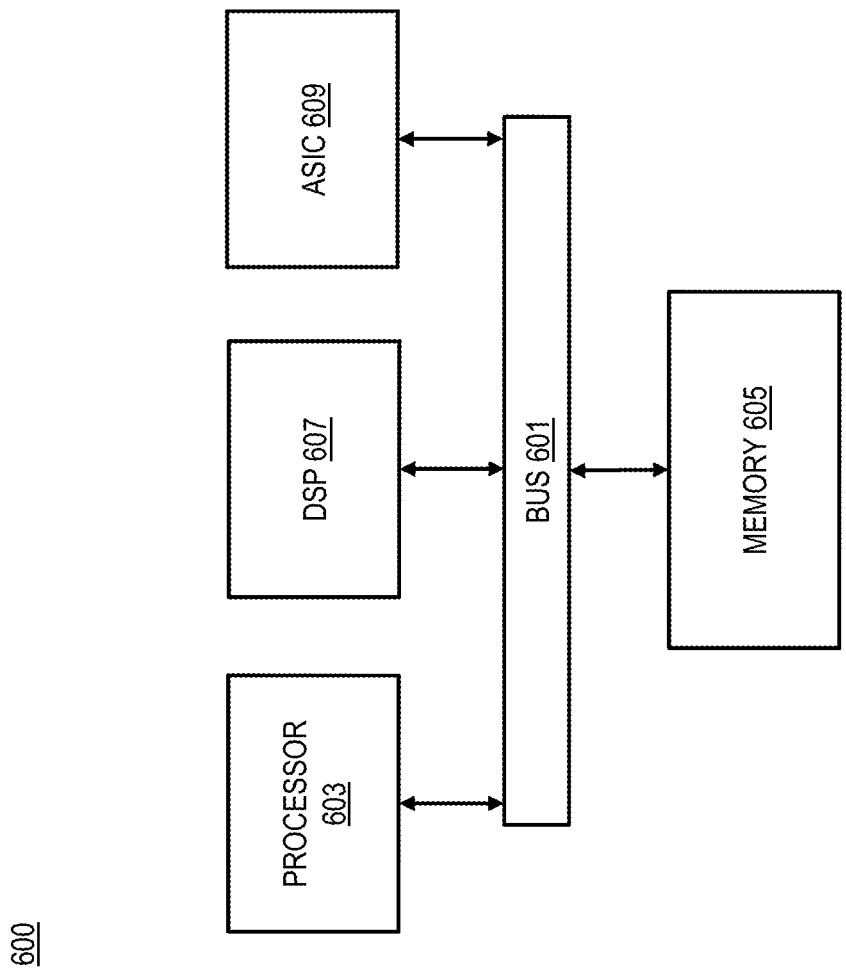
FIG. 6 is a diagram of a chip set that can be used to implement an embodiment of the invention.

FIG. 3 is a flowchart of a process for enabling hover-based interactions to define spatial searches on mobile maps, according to one embodiment. In one embodiment, the user interaction manager 109 performs the process 300 and is implemented in, for instance, a chip set including a processor and a memory as shown in FIG. 6. In step 301, the user interaction manager 109 causes, at least in part, a rendering of at least one user interface depicting mapping information. By way of example the mapping information may include one or more mobile map applications, one or more digital maps, or a combination thereof. In addition, the at least one user interface allows a user to define a specific spatial search zone on the mapping information while still maintaining critical core tasks often associated with such mapping information (e.g., panning a map within a screen).

In step 303, the user interaction manager 109 determines an initiation of the one or more hover-based interactions. By way of example the one or more hover-based interactions may include a hovering of a finger a few millimeters above a screen of a mobile device (e.g., a mobile phone and/or a mobile tablet). In one embodiment, the user interaction manager 109 may determine the initiation of the one or more hover-based interactions based on a proximity of a finger input to the screen as well as one or more time periods associated with the one or more hover-based interactions (e.g., one to two seconds).

Figure 4A:
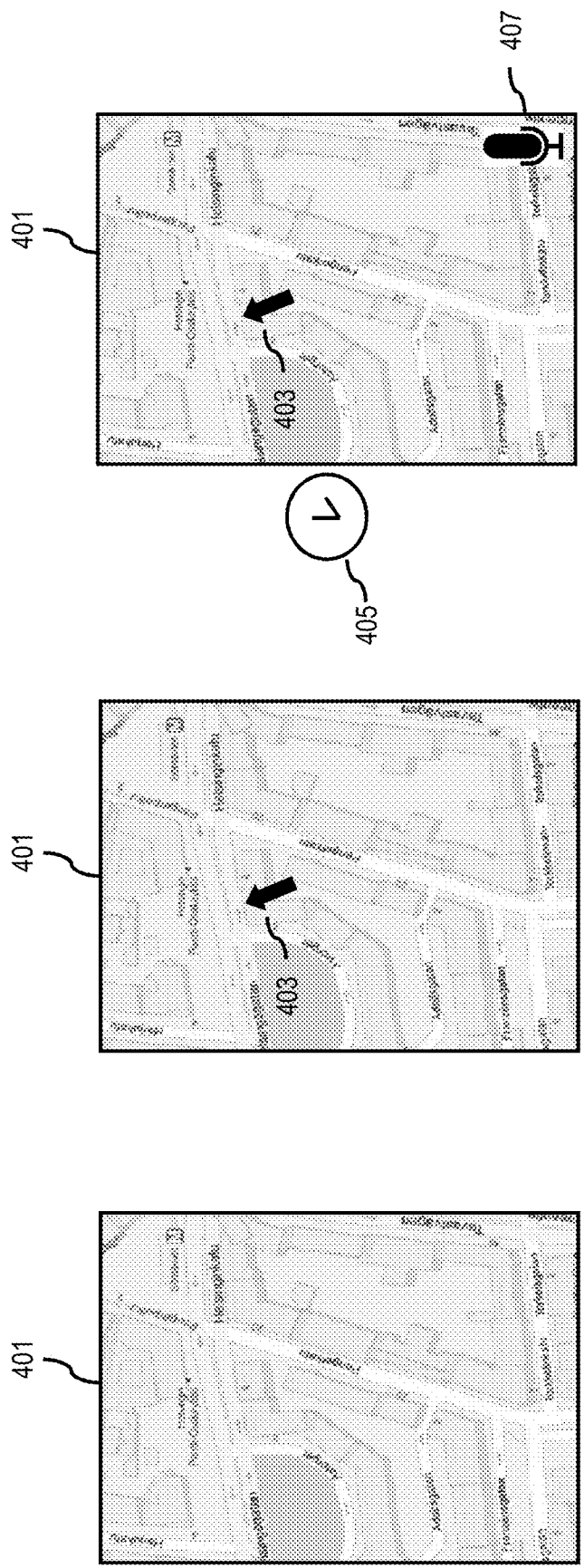
FIGS. 4A-4D are diagrams of user interfaces utilized in the process of FIG. 3, according to various embodiments.

In step 305, the user interaction manager 109 causes, at least in part, a rendering of at least one notification associated with the initiation, the one or more hover-based interactions, or a combination thereof. As an example, after a defined period of time (e.g., one to two seconds), the user interaction manager 109 can cause a rendering of a cursor on the screen, centered under the location of the one or more hover-based interactions. More specifically, the at least one notification may include a rendering of a circle the approximate diameter of a fingertip, a clock, a search icon, or a combination thereof. An illustrative example of the various notifications is depicted in FIG. 4A.

In step 307, the user interaction manager 109 processes and/or facilitates a processing of one or more hover-based interactions with the at least one user interface to determine one or more parameters for one or more spatial searches over the mapping information. By way of example, a user can draw one or more spatial search zones on a map where he or she wishes to search using one or more hover-based interactions. In particular, the one or more user-defined spatial search zones may be based on an approximate distance (e.g., a walking distance, a driving distance, etc.).

Figure 4B:
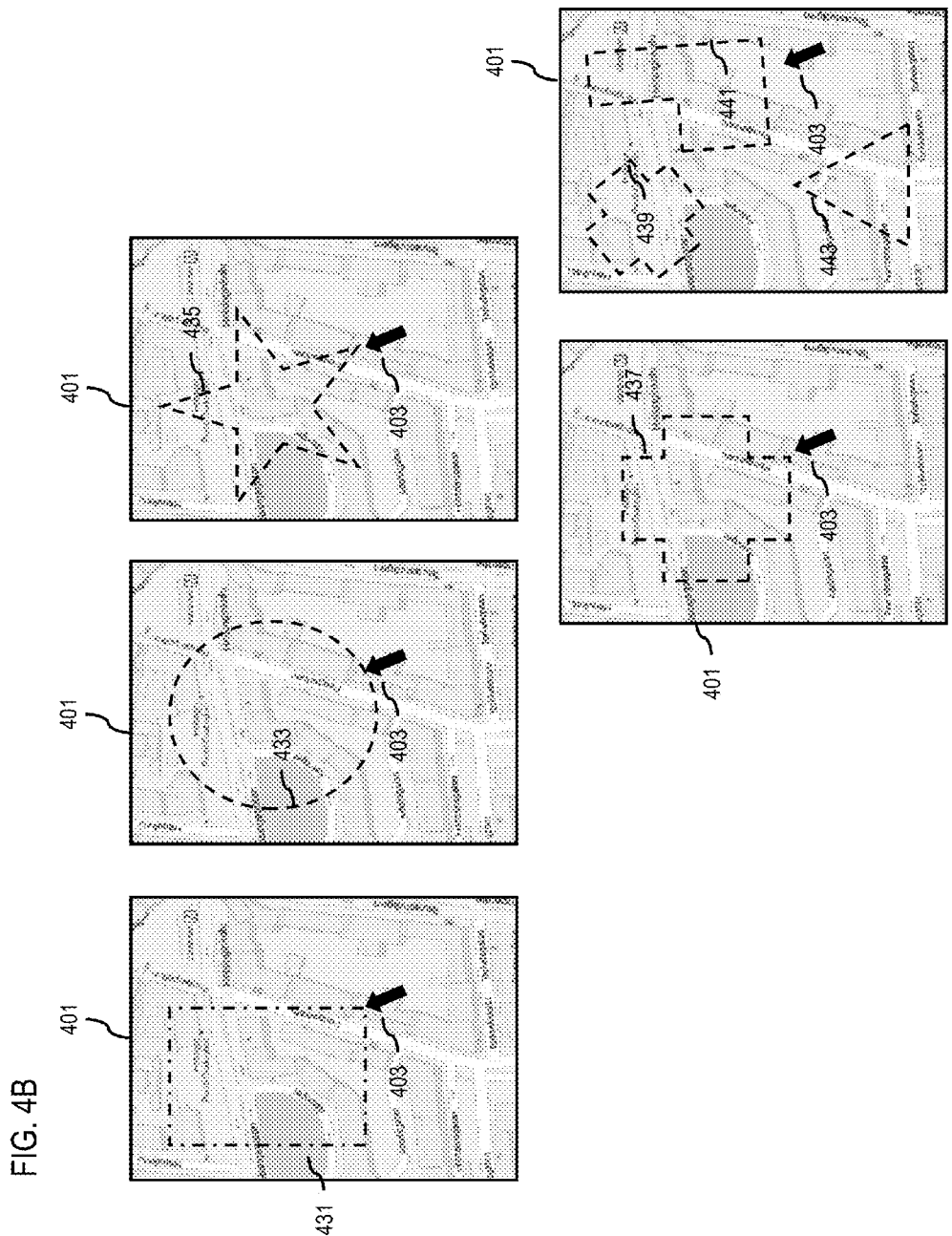

In step 309, the user interaction manager 109 processes and/or facilitates a processing of the one or more hover-based interactions to determine at least one boundary, at least one path, or a combination thereof, wherein the at least one boundary, the at least one path, or a combination thereof comprise, at least in part, the one or more parameters. As an example, the at least one boundary, the at least one path, or a combination thereof of the one or more spatial search zones defined by a user using one or more hover-based interactions may be based on one or more symmetrical shares (e.g., a square), one or more asymmetrical shapes, or a combination thereof. An illustrative example of the various boundaries and/or shapes is depicted in FIG. 4B.

In step 311, the user interaction manager 109 optionally processes and/or facilitates a processing of the one or more hover-based interactions to determine at least one hovering distance. By way of example, the at least one hovering distance may range within a few millimeters above the screen (e.g., 5 to 10 millimeters).

In step 313, the user interaction manager 109 optionally determines the one or more parameters, the one or more spatial searches, or a combination thereof based, at least in part, on the at least one hovering distance. As an example, while hovering a certain distance from the display may be used to support zoom-in/zoom-out functionality (i.e., critical core tasks), it may also be used by the user interaction manager 109 in order to enable different commands while in hover mode (e.g., generating various search results).

In step 315, the user interaction manager 109 optionally causes, at least in part, a normalization of the at least one boundary, the at least one path, or a combination thereof to one or more features of the at least one user interface, the mapping information, or a combination thereof. By way of example, the user interaction manager 109 can determine to close off two or three lines of the one or more spatial search zones drawn by a user with the one or more hover-based interactions (e.g., complete a square or a rectangle) or the user interaction manager 109 can determine to "snap" the at least one boundary, the at least one path, or a combination thereof to one or more geographic boundaries (e.g., city blocks, roads, neighborhoods, etc.).

In step 317, the user interaction manager 109 processes and/or facilitates a processing of the one or more hover-based interactions in combination with one or more other modes of interaction to determine the one or more parameters, the one or more spatial searches, or a combination thereof. By way of example, the one or more other modes of interaction may include one or more voice-based interactions (e.g., voice recognition), one or more text-based interactions (e.g., a text search box), or a combination thereof. More specifically, once the user interaction manager 109 determines the one or more boundaries of the one or more spatial search zones drawn by a user, the user interface 109 enables the user to specify his or her search query by verbally saying what his or her query is (e.g., a restaurant) and/or entering the query using a text search box. As a result, the user interface 109 then renders the one or more responsive search results within the one or more spatial search zones, thus providing a filtered and more relevant search result to the user.

FIGS. 4A-4D are diagrams of an example user interface utilized in the process of FIG. 3, according to various embodiments. As shown, the example user interface of FIGS. 4A-4D includes one or more user interface elements and/or functionalities created and/or modified based, at least in part, on information, data, and/or signals resulting from the processes (e.g., processes 300) described with respect to FIG. 3. More specifically, FIG. 4A illustrates an initiation of one or more hover-based interactions with a user interface (e.g., user interface 401 depicting a mobile map) of a mobile device (e.g., a mobile phone and/or a mobile tablet). In one embodiment, when a user touches the user interface 401, the system 100 maintains the critical core tasks typically assigned to touch functions of mobile maps and enables a user to pan the mapping information to the area that he or she wants to view. In one embodiment, the system 100 next determines an initiation of one or more hover-based interactions (e.g., hovering a finger a few millimeters above the screen of the mobile device) and then renders at least one notification associated with the initiation, the one or more hover-based interactions, or a combination thereof (e.g., a cursor 403). In certain embodiments, the initiation of one or more hover-based interactions may also be represented by a clock 405 and/or a search icon 407, etc.). By way of example, after a defined period of time (e.g., one to two seconds), a cursor 403 will appear, centered under where the user's finger is located.

FIG. 4B is a diagram depicting one or more parameters for one or more spatial searches over the mapping information. In one embodiment, the system 100 next processes the one or more hover-based interactions with the user interface 401 to determine one or more parameters for the one or more spatial searches over the mapping information. By way of example, the system 100 enables a user to draw an area (e.g., area 431) with one or more hover-based interactions as represented by the cursor 403 on the mapping information where he or she wishes to focus his or her search. More specifically, the system 100 processes the one or more hover-based interactions to determine at least one boundary, at least one path, or a combination thereof of the one or more spatial search zones and renders a visual indicator of where the spatial search area is located (e.g., indicated by a dashed outline). As the system 100 processes the one or more hover-based interactions, the system 100 also maintains the critical core tasks often associated with the mapping information (e.g., panning the map with a pinching gesture to zoom in and out). Moreover, in one embodiment, the shape of the user-defined spatial zone (e.g., zones 431, 433, 435, 437, 439, 441, and 443) may be as symmetric or asymmetric as the user needs in order to search in certain physical areas depicted on the mapping information. In addition, in one embodiment, a user can lift his or her finger and then hover it over another area to outline multiple search zones on the mapping information as depicted by zones 439, 441, and 443.

Figure 4C:
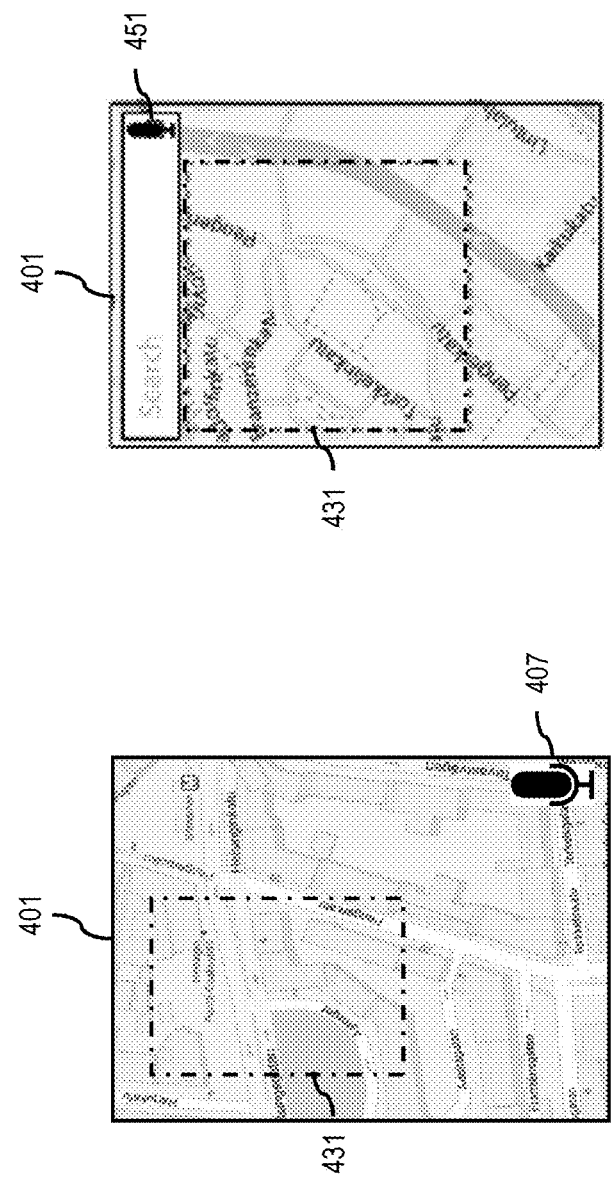

FIG. 4C is a diagram of the one or more other modes of interaction used in combination with the one or more hover-based interactions to determine one or more parameters, one or more spatial searches, or a combination thereof. More specifically, in one embodiment, the system 100 processes the one or more hover-based interactions in combination with one or more other modes of interaction (e.g., voice recognition technology 407 and/or a text search box 451). By way of example, once a user draws an area where they wish to search with one or more hover-based interactions (e.g., zone 431), the user can then verbally say or type what his or her specific query relates to (e.g., a restaurant).

Figure 4D:
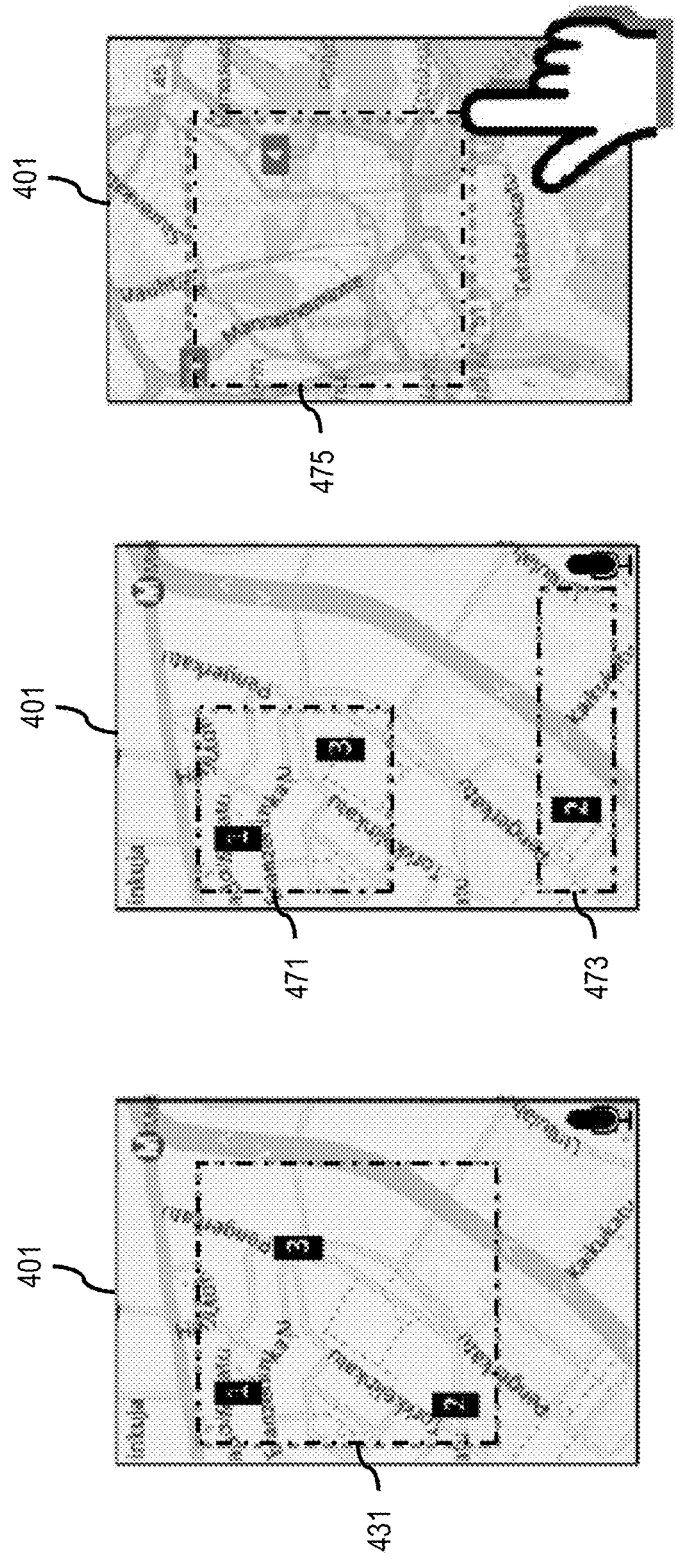

FIG. 4D is a diagram of the one or more search results rendered in the one or more spatial search zones. By way of example, after a user states his or her search query (e.g., a restaurant), the system 100 renders the search results that are located within the one or more user-defined spatial search zones (e.g., 431). As previously discussed, in the example use case where a user draws more than one spatial search zone, the system 100 will render the responsive results accordingly as depicted in zones 471 and 473. Any results outside of the zones (e.g., zones 431, 471, and 473) will be excluded by the system 100, thus providing a filtered and more relevant search result. Further, as previously discussed, in one embodiment, the system 100 maintains the ability to allow a user to zoom in and out of the mapping information and/or a particular spatial search zone (e.g., zone 475) in order to reduce or enlarge the one or more search areas.

The processes described herein for enabling hover-based interactions to define spatial searches on mobile maps may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
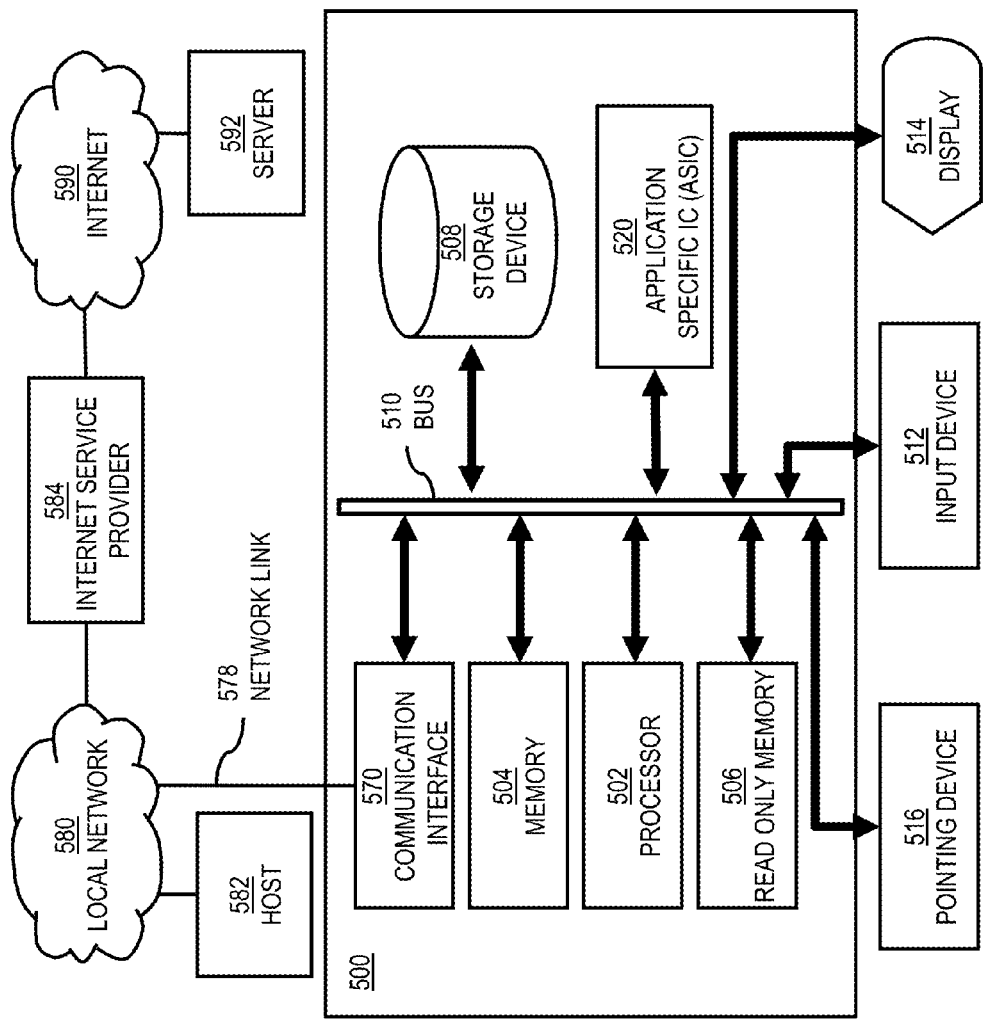
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to enable hover-based interactions to define spatial searches on mobile maps as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of enabling hover-based interactions to define spatial searches on mobile maps.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to enable hover-based interactions to define spatial searches on mobile maps. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for enabling hover-based interactions to define spatial searches on mobile maps. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for enabling hover-based interactions to define spatial searches on mobile maps, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with end users, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for enabling hover-based interactions to define spatial searches on mobile maps to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to enable hover-based interactions to define spatial searches on mobile maps as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of enabling hover-based interactions to define spatial searches on mobile maps.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable hover-based interactions to define spatial searches on mobile maps. The memory 605 also stores the data associated with or generated by the execution of the inventive steps.

Figure 7:
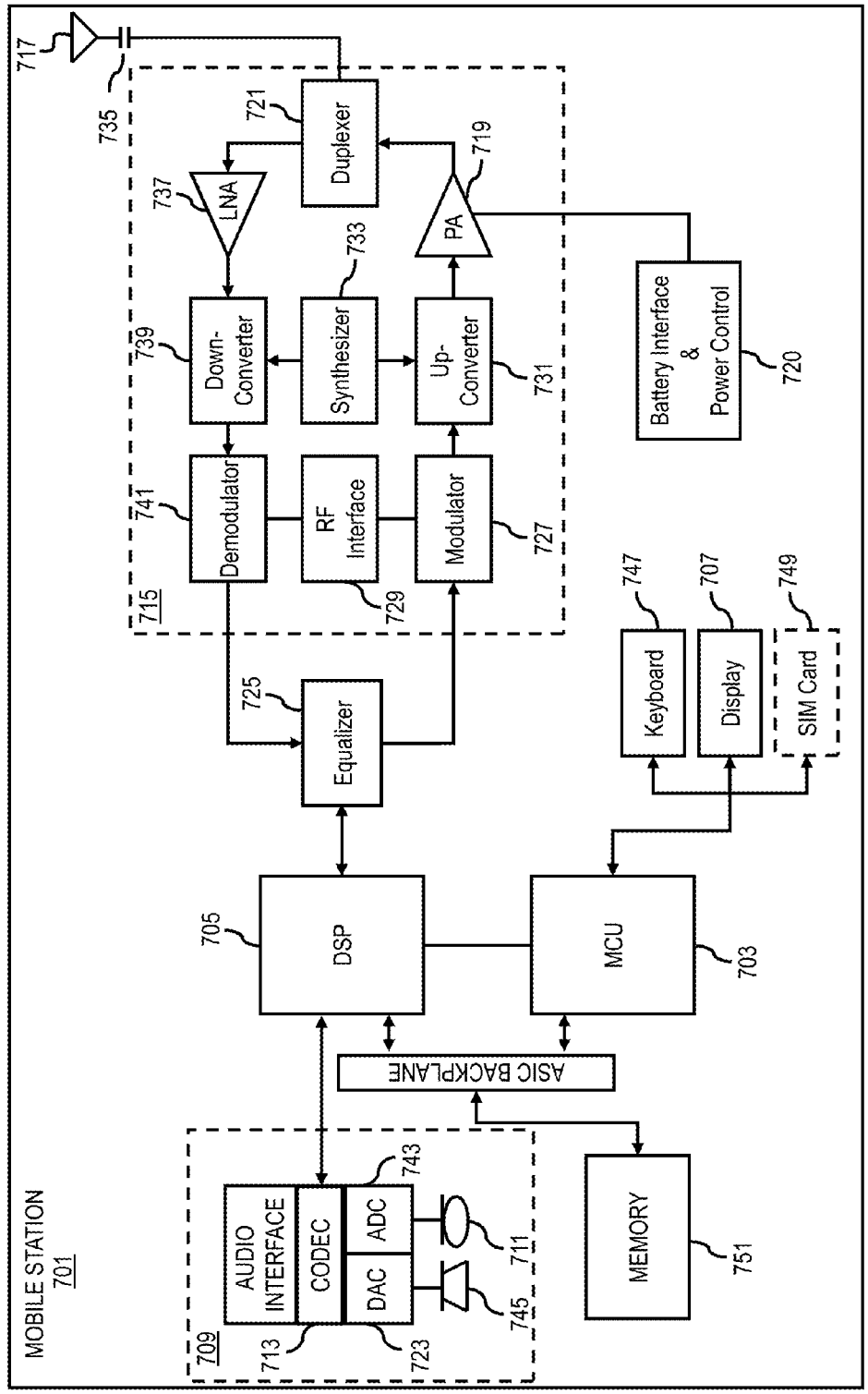
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of enabling hover-based interactions to define spatial searches on mobile maps. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of enabling hover-based interactions to define spatial searches on mobile maps. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 743. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 723 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to enable hover-based interactions to define spatial searches on mobile maps. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 743 and DAC 723. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    initiating, by an apparatus, a rendering of a user interface depicting mapping information, the user interface being included in a user device configured to connect to a communications network;
    determining, by the apparatus, an initiation of a plurality of hover-based interactions over the user interface;
    processing, by the apparatus, the hover-based interactions to determine at least one hovering distance change and one or more parameters for one or more spatial searches over the mapping information, the one or more parameters comprising a plurality of search areas for the one or more spatial searches, the hover-based interactions including drawing the search areas via lifting a user finger to or above a predetermined hovering distance before starting drawing a subsequent search area;
    varying the one or more parameters, the one or more spatial searches, or a combination thereof, in proportion to the at least one hovering distance change; and
    initiating, by the apparatus, the one or more spatial searches within the plurality of search areas based, at least in part, on the varying.

2. A method of claim 1, further comprising:
    initiating a rendering of one or more results of the one or more spatial searches on the user interface,
    wherein the user interface facilitates, at least in part, one or more other touch-based interactions that operate simultaneously with and at least substantially independently of the hover-based interactions.

3. A method of claim 2,
    wherein the one or more other touch-based interactions are associated with one or more panning operations, one or more zooming operations, or a combination thereof, over the mapping information.

4. A method of claim 1, further comprising:
    processing the hover-based interactions to determine at least one boundary, at least one path, or a combination thereof,
    wherein the at least one boundary, the at least one path, or a combination thereof comprise, at least in part, the one or more parameters, and
    wherein at least one panning operation, at least one zooming operation, or a combination thereof, over the mapping information is in proportion to the at least one hovering distance change.

5. A method of claim 4, wherein the at least one boundary, the at least one path, or a combination thereof are based, at least in part, on one or more symmetrical shapes, one or more asymmetrical shapes, or a combination thereof.

6. A method of claim 4, further comprising:
    initiating a normalization of the at least one boundary, the at least one path, or a combination thereof to one or more features of the at least one user interface, the mapping information, or a combination thereof.

7. A method of claim 1, further comprising:
    processing the hover-based interactions in combination with one or more other modes of interaction to determine the one or more parameters, the one or more spatial searches, or a combination thereof,
    wherein the user interface facilitates, at least in part, one or more touch-based interactions that operate at least substantially simultaneously with the hover-based interactions.

8. A method of claim 7, wherein the one or more other modes of interaction include, at least in part, one or more voice-based interactions, one or more text-based interactions, or a combination thereof.

9. A method of claim 1, further comprising:
    processing the hover-based interactions to determine a plurality of hovering locations over the mapping information; and
    initiating at least one variation of the one or more parameters, the one or more spatial searches, or a combination thereof, corresponding to the hovering locations,
    wherein the user interface facilitates, at least in part, the one or more spatial searches substantially simultaneously within the hovering locations.

10. A method of claim 1, further comprising:
    initiating a rendering of at least one notification associated with the initiation of the hover-based interactions, the hover-based interactions, or a combination thereof,
    wherein the one or more spatial searches are initiated concurrently within the search areas.

11. A method of claim 1, further comprising:
    initiating a rendering a cursor representing the plurality of hover-based interactions with the mapping information.

12. An apparatus comprising:
    at least one processor; and
    at least one memory including computer program code for one or more programs, the at least one memory and the computer program code configured to, with the at least one processor, cause the apparatus to perform at least the following:
    initiate a rendering of a user interface depicting mapping information, the user interface being included in a user device configured to connect to a communication network;
    determine an initiation of a plurality of hover-based interactions over the user interface;
    process the hover-based interactions to determine at least one hovering distance change and one or more parameters for one or more spatial searches over the mapping information, the one or more parameters comprising a plurality of search areas for the one or more spatial searches, the hover-based interactions including drawing the search areas via lifting a user finger to or above a predetermined hovering distance before starting drawing a subsequent search area;

vary the one or more parameters, the one or more spatial searches, or a combination thereof, in proportion to the at least one hovering distance change; and initiate the one or more spatial searches within the plurality of search areas based, at least in part, on the varying.

13. An apparatus of claim 12, wherein the apparatus is further caused to:

initiate a rendering of one or more results of the one or more spatial searches on the user interface, wherein the user interface facilitates, at least in part, one or more other touch-based interactions that operate simultaneously with and at least substantially independently of the hover-based interactions.

14. The apparatus of claim 13, wherein the one or more other touch-based interactions are associated with one or more panning operations over the mapping information.

15. An apparatus of claim 12, wherein the apparatus is further caused to:

process the hover-based interactions to determine at least one boundary, at least one path, or a combination thereof, wherein the at least one boundary, the at least one path, or a combination thereof comprise, at least in part, the one or more parameters.

16. An apparatus of claim 15, wherein the at least one boundary, the at least one path, or a combination thereof are based, at least in part, on one or more symmetrical shapes, one or more asymmetrical shapes, or a combination thereof.

17. An apparatus of claim 15, wherein the apparatus is further caused to:

initiate a normalization of the at least one boundary, the at least one path, or a combination thereof to one or more features of the user interface, the mapping information, or a combination thereof.

18. An apparatus of claim 12, wherein the apparatus is further caused to:

process the hover-based interactions in combination with one or more other modes of interaction to determine the one or more parameters, the one or more spatial searches, or a combination thereof.

19. An apparatus of claim 18, wherein the one or more other modes of interaction include, at least in part, one or more voice-based interactions, one or more text-based interactions, or a combination thereof.

20. An apparatus of claim 12, wherein the apparatus is further caused to:

process the hover-based interactions to determine at least one hovering distance change; and at least one variation of the one or more parameters, the one or more spatial searches, or a combination thereof the one or more parameters, the one or more spatial searches, or a combination thereof, in proportion to the at least one hovering distance change.

21. An apparatus of claim 12, wherein the apparatus is further caused to:

initiate a rendering of at least one notification associated with the initiation, the hover-based interactions, or a combination thereof.

\* \* \* \* \*